United States Patent
Luh

[11] Patent Number: 5,838,129
[45] Date of Patent: Nov. 17, 1998

[54] DRIVING METHOD FOR MULTIPLE-POLE MOTORS WITH OPTIMUM DRIVING WAVEFORM

[76] Inventor: Yih-Ping Luh, 7 th Fl., No. 23, Alley 137, Gin Shin Road, Taipei, Taiwan

[21] Appl. No.: 910,198

[22] Filed: Aug. 13, 1997

[51] Int. Cl.$^6$ .................................................. H02P 7/00
[52] U.S. Cl. ........................... 318/439; 318/254; 318/432
[58] Field of Search ..................................... 318/254, 439, 318/138, 432; 388/803, 804, 805, 812, 813, 815, 820, 823, 930

[56] References Cited

U.S. PATENT DOCUMENTS

| | | | |
|---|---|---|---|
| 4,876,491 | 10/1989 | Squires et al. ........................... | 318/138 |
| 5,321,343 | 6/1994 | Kane, Jr. et al. ....................... | 318/254 |
| 5,497,064 | 3/1996 | Sistine .................................... | 318/701 |
| 5,717,298 | 2/1998 | Tang et al. .............................. | 318/254 |

*Primary Examiner*—Jonathan Wysocki
*Attorney, Agent, or Firm*—Bacon & Thomas, PLLC

[57] ABSTRACT

This invention concerns a method for driving multiple poles (rotors and stators) motors. A driving waveform with the best efficiency according to electromagnetic analysis is used to avoid unnecessary magnetic saturation effect to reduce iron loss of the motor. Since the smallest possible current is used to generate maximum torque, copper loss is reduced so the motor is not heated and its efficiency is increased. In addition, the driving method divides magnetic poles into 3N parts (N is an integer) so that poles at opposite corners has the same waveform and the same torque. This implementation avoids generation of static force, effectively generates torque and avoids vibration and noises. It is an energy saving, effective and stable way of driving motor.

5 Claims, 4 Drawing Sheets

DRIVING METHOD FOR MULTIPLE-POLE MOTORS WITH OPTIMUM DRIVING WAVEFORM

BACKGROUND OF THE INVENTION

The present invention concerns a method for driving multiple-pole (rotors and stators) motors. A driving waveform with the best efficiency according to electromagnetic analysis is used to reduce iron loss and copper loss and to increase efficiency. Torque is generated by symmetric driving method to achieve stable operation of the motor.

The driving waveforms used for traditional motors are sinusoidal waves, square waves or triangular waves. It has not been calculated by electromagnetic analysis to consider magnetic saturation problem, iron loss, copper loss, and the fact that armature is not evenly distributed along 360 degree of the core. So motors are usually been heated easily and its efficiency can not reach maximum. Furthermore, magnetic poles do not have the design to generate symmetric torque by poles dividing and the motor has the problems of vibration and noises. From the preceding description it can be known that a motor with high efficiency and stability should at least possess (1). the most efficient driving waveform: implement the driving waveform according to electromagnetic analysis to avoid unnecessary magnetic saturation to reduce iron loss and copper loss, so that motor will not be heated and to increase its efficiency. (2). a stable driving method: generate torque by symmetric driving method to achieve stable operation of the motor. By contrast, the problems of low efficiency and lack of stability for traditional motors are obvious.

SUMMARY OF THE INVENTION

Therefore the objective of the present invention is to provide a stable and optimized driving waveform so that unnecessary magnetic saturation effect is avoided to reduce iron loss and copper loss and to increase motor efficiency.

Features of the present invention are: (1). magnetic poles of the motor are divided into 3N parts (N is an integer) so that poles at opposite corners has the same driving waveform and the same torque—a paired torque. This implementation avoids generation of static force, effectively generates torque and avoids vibration and noises. The life time of motor can be increased. (2). implement the driving waveform according to electromagnetic analysis—starts from the pole that generates the maximum torque. Currents through each pole are calculated by electromagnetic analysis so that operation is limited within linear region of the magnetic flux density. Unless required by system currents are not added to drive poles into magnet saturation region to avoid unnecessary magnet saturation effect and keep the magnet flux within linear operation region and reduce motor iron loss. (3). Use the least amount of current to generate maximum torque so that copper loss by large current through copper wire is reduced. The motor heating is also reduced to increase motor efficiency.

A BRIEF DESCRIPTION OF THE DRAWINGS

The present invention can be better understood with the following figures and illustrations.

Figure 3A:
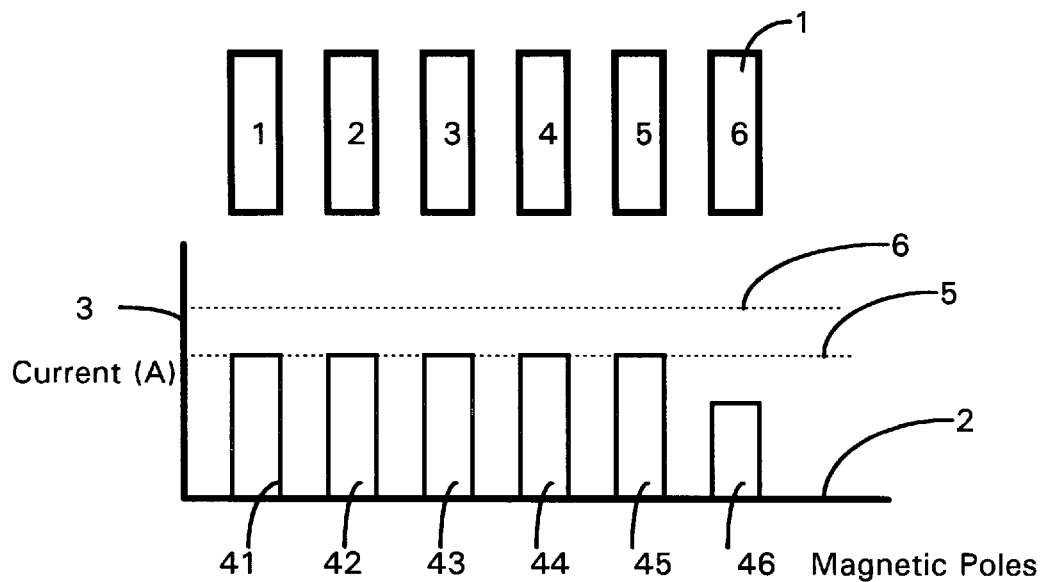
Figure 3B:
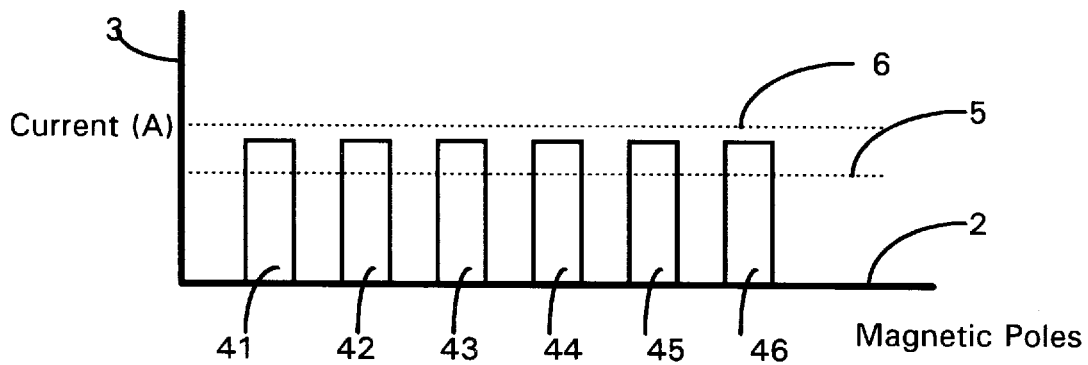

FIGS. 3(A) to 3(B) are two examples of optimum driving waveform.

Figure 4A:
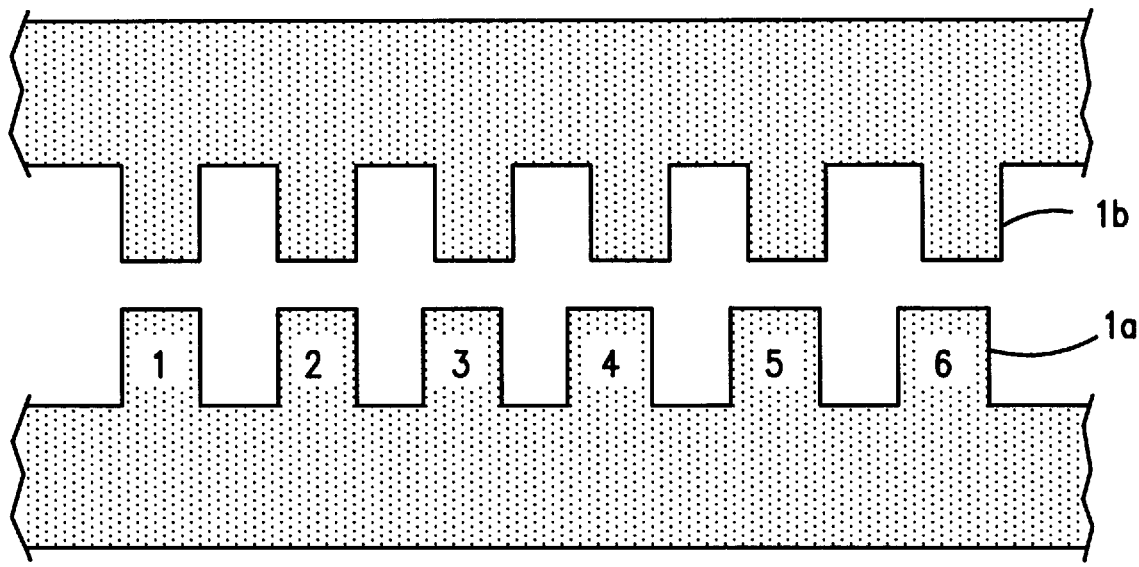
Figure 4B:
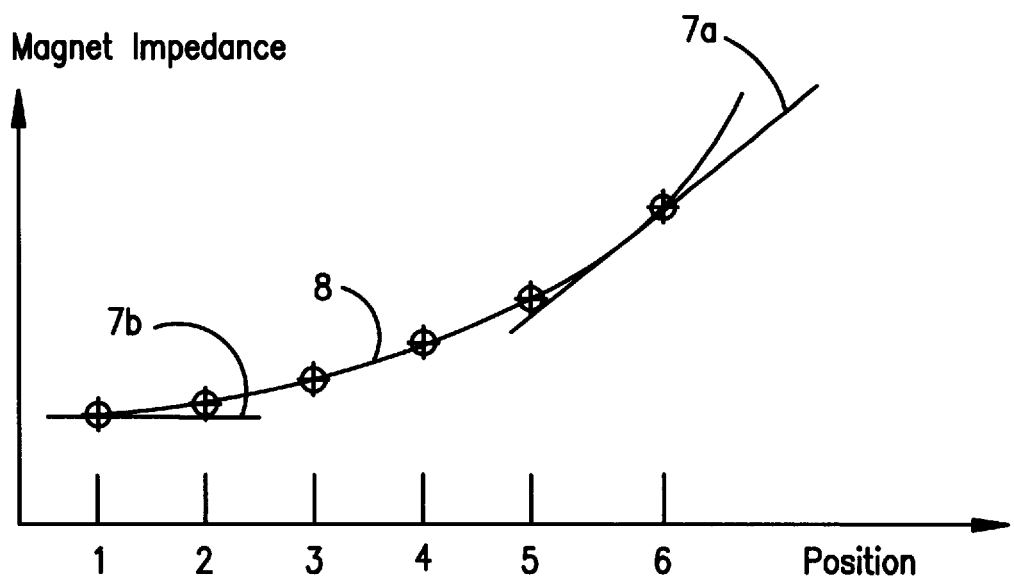

FIGS. 4A and 4B are schematic diagrams showing relation between position of motor pole and magnetic impedance.

DETAILED DESCRIPTION OF THE INVENTION

Figure 1:
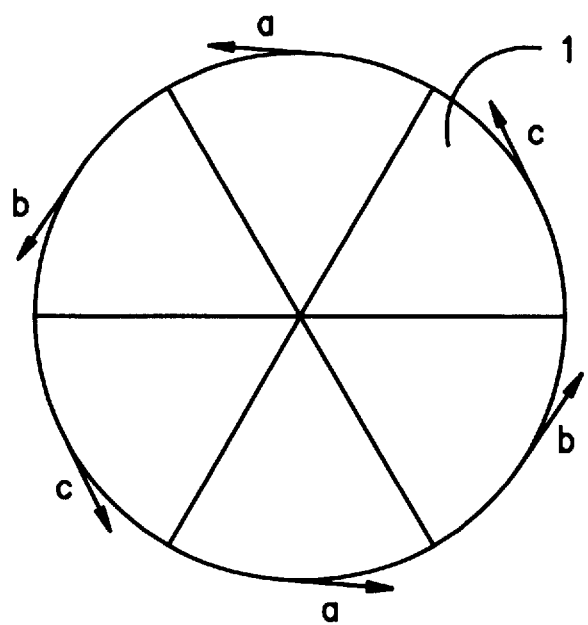
FIG. 1 is a schematic diagram showing the principle of forming a paired torque.

As shown in FIG. 1, magnetic poles of the motor are divided into 3N parts (N is an integer). In this figure N=2 as an example. Poles at opposite corners has the same driving waveform and the same torque but the total force are zero; that is, the 3 pairs of torques aa, bb and cc have a total force of zero. This implementation effectively avoids generation of static force, and avoids vibration and noises. The life time of motor can thus be increased.

Figure 2:
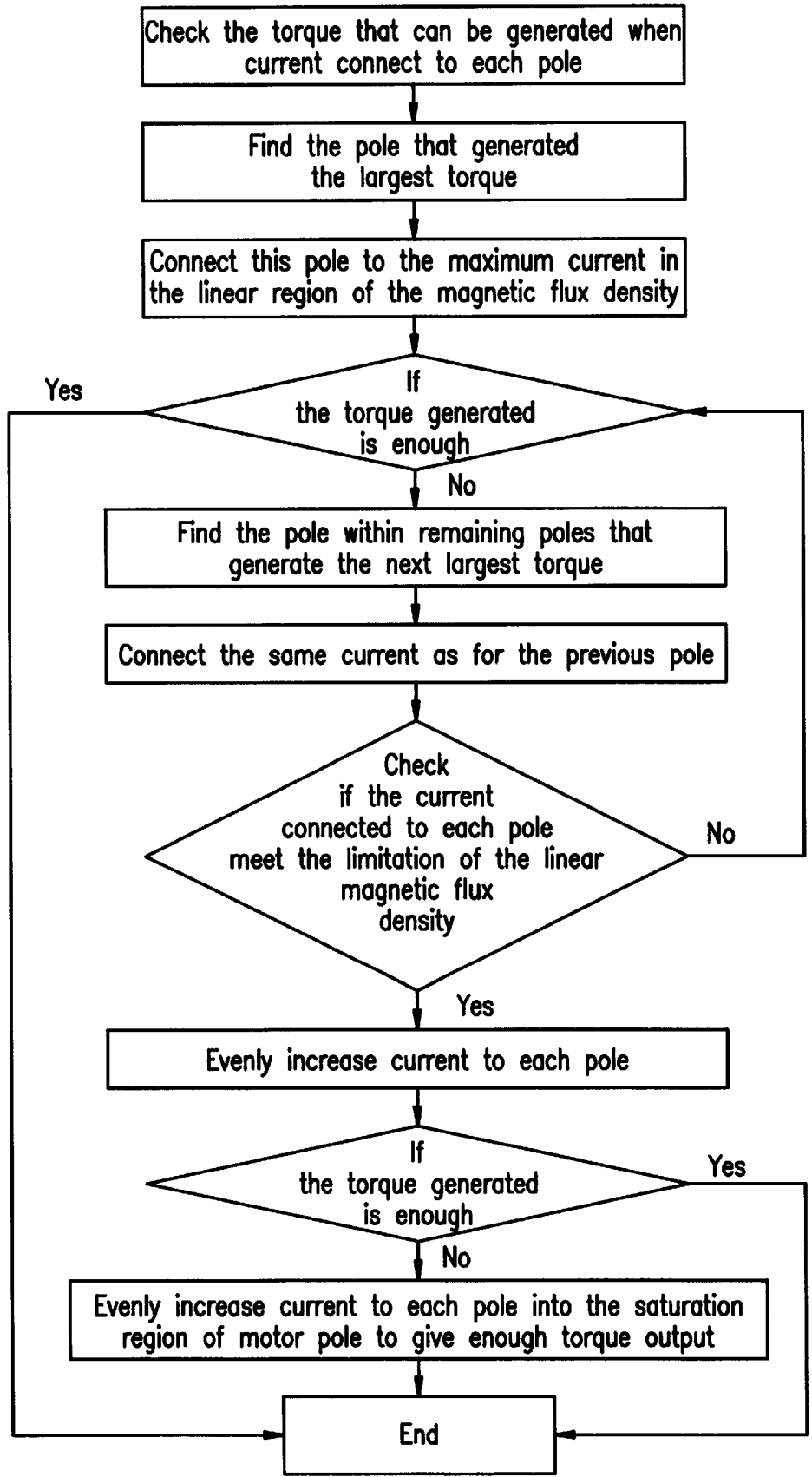
FIG. 2 is a schematic diagram for the procedure of forming optimum driving waveform.

As shown in FIG. 2, the procedure of forming optimum driving waveform is as follows:

(1) check the torque that can be generated when current is connected to each pole. (2) Find the pole that generates the largest torque. Connect this pole to the maximum current in the linear region of the magnetic flux density. The iron loss is very low for this configuration so the current is the optimum driving waveform.

(3) If the torque generated is not enough, find the pole within remaining poles that generate the next largest torque. Connect the same current as for the previous pole. Now the current is still in the linear region of the magnetic flux density.

(4) Repeat the last step until the generated torques meets system requirement. If the total torque is still not enough, then evenly increase current to each pole into the saturation region of motor pole to give higher torque output.

FIGS. 3(A) to 3(B) are two examples of the optimum driving waveform. There is a set of poles1 (assuming a total of 6 poles) with the corresponding driving waveform as shown in FIG. 3(A) and FIG. 3(B). Dotted line 5 represents the maximum current in the linear region of the magnetic flux density. Dotted line 6 represents the current at saturation of magnetic flux density. The driving waveform in FIG. 3(A) is such that current 41 42 43 44 45 except for pole 6 all reaches the maximum current in the linear region of the magnetic flux density. Current to pole 6 is lower than the maximum current in the linear region of the magnetic flux density. Since the current to each pole is controlled to values lower than the maximum current in the linear region of the magnetic flux density, iron and copper loss is very low and it is energy saving.

As shown in FIG. 3(B), if it is required by system to increase output torque, then after the pole currents of 41 42 43 44 45 46 all reaches the maximum current in the linear region of the magnetic flux density, evenly increase current to each pole until saturation of magnetic flux density.

As shown in FIG. 4, if positions of stator pole 1*a* and rotor pole 1*b* are as in FIG. 4(A), the relation between pole position and reluctance is as in FIG. 4(B) curve 8. Slopes of tangent lines 7*a* and 7*b* of curve 8 represent the magnitude of the torques generated when the poles have currents through them. Slope of tangent line 7*a* is larger than that of tangent line 7*b* so the torque is larger. From the above calculation and analysis we can obtain the optimum driving waveform.

The present invention uses the optimum driving waveform to lower the iron and copper loss so the motor will not be heated, it also uses the method of pole dividing to symmetrically drive the motor to generate symmetric torque. It largely enhances efficiency of a motor, has the motor run stably and improve the vibration and noise problems. It is a very advanced, practical and unique invention.

I claim:

1. A driving method for a motor which has multiple poles (rotors and stators), includes the following procedure:
   (1) Check the torque that can be generated when current connects to each pole
   (2) Find the pole that generated the largest torque; connect this pole to the maximum current in the linear region of the magnetic flux density
   (3) If the torque generated is not enough, find the pole within remaining poles that generate the next largest torque; connect the same current as for the previous pole
   (4) If the total torque is still not enough, then evenly increase current to each pole into the saturation region of motor pole to give higher torque output
   (5) Divide magnetic poles of the motor into 3N parts (N is an integer) so that poles at opposite corners has the same driving waveform and the same torque—a paired torque.

2. The driving method for motor of claim 1 where in said the feature is its method of finding the pole of maximum torque when current is connected to the pole is as follows:
   analyze and calculate the relation between pole position and magnet impedance, find the pole with maximum $\Delta$position/$\Delta$magnet impedance.

3. The driving method for motor of claim 1 where in said, the feature is that current to each pole is calculated according to electromagnetic analysis and the current is limited to the linear region of the magnetic flux density.

4. The driving method for motor of claim 1 where in said, the feature is that unless required by system the current to pole is not increased to drive the pole into magnetic saturation region to avoid necessary magnetic saturation effect in driving action and keep the magnet flux in the linear region as possible.

5. The driving method for motor of claim 1 where in said, the feature is that magnetic poles of the motor are divided into 3N parts (N is an integer) so that poles at opposite corners has the same driving waveform and the same torque—a paired torque.

* * * * *